United States Patent Office 3,597,471
Patented Aug. 3, 1971

3,597,471
PROCESS FOR MAKING BIS(-HYDROXYALKYL) TEREPHTHALATES
Michael Anthony Sapienza, Hendersonville, N.C., assignor to E. I. du Pont de Nemours and Company, Wilmington, Del.
No Drawing. Filed Apr. 24, 1968, Ser. No. 723,932
Int. Cl. C07c 69/82
U.S. Cl. 260—475P          4 Claims

ABSTRACT OF THE DISCLOSURE

In a continuous process of manufacturing bis-hydroxyalkyl terephthalates where a dialkyl terephthalate, an alkylene glycol and an ester exchange catalyst—the salt of a metal and a weak acid such as zinc acetate are added to an ester exchange process, the improvement of adding the acid which is the corresponding acid of the catalyst having the same anion as the salt of the catalyst, such as acetic acid, to allow the process of preparing bis-hydroxyalkyl terephthalate, e.g., bis (2-hydroxyethyl) terephthalate, to continue smoothly by inhibiting the formation of catalyst precipitates which would form, plug the ester exchange unit and cause column cycling.

BACKGROUND OF THE INVENTION

(1) Field of the invention

This invention relates to the art of manufacturing bis-hydroxyalkyl terephthalates. More specifically, this invention relates to the art of manufacturing bis-(2-hydroxyethyl) terephthalates.

(2) Description of the prior art

In the manufacture of bis-hydroxyalkylene terephthalates as described in Whinfield and Dickson, U.S. 2,465,319, Mar. 22, 1949 according to the continuous process taught by Hurt and Pieper, U.S. 2,905,707, Sept. 22, 1959, dialkyl terephthalate, ethylene glycol and an ester exchange catalyst such as zinc acetate are introduced to an ester exchange column. The ester exchange column is made up of a series of sieve plates or bubble cap plates with each plate having a downcomer. As the liquid reactants rest on each plate ethylene glycol vapors are introduced at the bottom of the column and rise through the column by passing through the holes in the plates making intimate contact with the liquid reactants. The liquid bis(2-hydroxyethyl) terephthalate product formed plus some unreacted components progressively flow through the downcomers where they are finally collected at the bottom of the column.

It has been observed that the metal catalysts, in side reactions, form salts that precipitate and plug the sieve plates. This greatly reduces the efficiency of the ester exchange column by causing an increased pressure drop across the plates which results in column cycling and may necessitate a column shut down. In addition the precipitate may collect in the filters and the valves controlling the unit, causing additional problems.

These prior disadvantages have been overcome according to this invention, it being found that the addition of an acid having the same anion as the salt of the catalyst to the ester exchange column will inhibit the formation of these salts and also convert any salts already formed back into a useful catalyst. The acid does not affect the catalyst activity and is photographically inert.

A number of patents disclose the incidental presence of acetic acid with the ester interchange catalyst. However, these patents do not teach the addition of particular ranges of amounts of acetic acid and no reasons are given for the presence of acetic acid. Following are such patents.

Langkammerer, U.S. 2,621,193, Dec. 9, 1952 discloses a method of preparing a soluble polymeric titanic acid ester by heating the tetraortho-titanate in the presence of ½ to 2 moles of acetic acid per mole of titanate. This patent further discloses that the products of the invention may be used as catalysts for ester interchange reactions but no mention is made as to whether or not the excess acetic acid would be present in such a process.

Zettlemoyer, U.S. 2,644,839, July 7, 1953 discloses a catalytic production of esters from organic acids, i.e., acetic acid, and alcohols, i.e. n-butyl alcohol, in the presence of a catalyst, i.e., zinc acetate. It is preferred that in this process the metal salt be the salt of a fatty acid of 1–18 carbon atoms, the acid radical of which is that of the same acid used to react with the alcohol. Such a limitation results in minimum contamination and maximum conversion. No mention is made of the preparation of bis-hydroxyalkyl terephthalates.

Vodonik, U.S. 2,681,360, June 15, 1954 discloses a process for forming bis (2-hydroxyethyl) terephthalate in the presence of a catalyst mixture comprising lithium hydride and at least one ethylene glycol-soluble metal salt of a metal selected from the group consisting of cadmium, magnesium and zinc with an acid from the group consisting of fatty acids containing up to 18 carbon atoms, salicylic acid, and lactic acid. No mention is made of adding the catalyst in an excess of acetic acid.

Finnish Pat. 28,134, assigned to ICI granted Jan. 26, 1955, discloses a process of manufacturing polymethylene terephthalate wherein an antimony catalyst is used. The following disclosure is made in this patent. An antimony salt which has given excellent results is the acetate, which, is obtained by reacting antimonous anhydride with acetic acid. It has been observed that in practice it was useless to separate the salt, because the mixture within the acetic acid medium can be dissolved in glycol and poured directly into the reaction apparatus before the polycondensation reaction occurs.

SUMMARY OF THE INVENTION

In the process which comprises reacting a glycol of the formula $HO(CH_2)_nOH$, where $n$ is an integer from 2 to 10 inclusive, with a dialkyl ester of terephthalic acid having 1 to 4 carbon atoms in the alkyl group under conditions to effect ester interchange in the presence of an ester interchange catalyst which is the salt of a metal and a fatty acid of 1–18 carbon atoms, the improvement which comprises the addition of the corresponding acid of the catalyst having the same anion as the salt of the catalyst in the amount of 0.02%–10%, and preferably to 0.0235% to 1.5%, by weight of liquid dialkyl terephthalate.

DESCRIPTION OF THE PREFERRED EMBODIMENT

A process of manufacturing a polymeric product which is capable of being cold drawn into fibers, films and the like is disclosed in Whinfield and Dickson, U.S. 2,465,319. The polymeric product may be made by heating glycols of the series $HO(CH_2)_nOH$ where $n$ is an integer within the range of 2 to 10, with terephthalic acid or with esters or other terephthalic acid bodies which are capable of reacting with the glycols to form glycol esters with the reaction products being heated at temperatures above their melting points until highly polymeric esters having cold drawing properties are obtained.

The chemical reaction in the production of these polymeric linear terephthalic esters involve an ester interchange action advantageously carried out in the presence of an ester interchange catalyst.

In the preferred continuous ester interchange process of this invention, liquid ethylene glycol, liquid dimethyl terephthalate and a liquid solution of the ester exchange catalyst zinc acetate dihydrate dissolved in ethylene glycol is added to the upper portion of the ester exchange column as described in Hurt et al., U.S. Pat. 2,905,707. In addition acetic acid is added to improve the process by preventing catalyst precipitation.

As is well known in the art, the liquid reactants and reaction products passing downwardly remain on the top of each sieve plate in the column for a period of time and flow through the downcomers or overflow pipes onto the next lower plate.

As the liquid passes downward it comes into intimate contact with vapors of ethylene glycol which are rising in the column through the plates. The intimate contact between the reactants passing downwardly in the liquid phase plus the agitating effect of the rising ethylene glycol vapors, which act to strip the alkyl alcohol from the falling reactants and reaction products and carry the alkyl alcohol upwards, drives the alcoholysis (ester exchange) reaction towards the formation of bis (2-hydroxyethyl) terephthalate. The reaction product passes downward from plate to plate and is collected in a boiler in the bottom of the ester exchange column where it is preferably drawn off continuously.

While the main reaction is taking place forming bis(2-hydroxyethyl) terephthalate, the catalyst zinc ion, in a side reaction, is forming coordinate compounds. These coordinate compounds have been identified as zinc hydroxide, zinc oxide, zinc glycolate and zinc terephthalate. A possible mechanism to explain the formation of zinc hydroxide from zinc acetate is as follows.

Mechanisms for Zinc Precipitation

X.

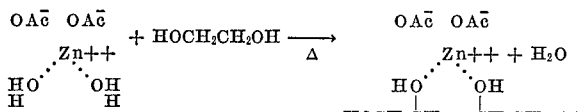

Y.

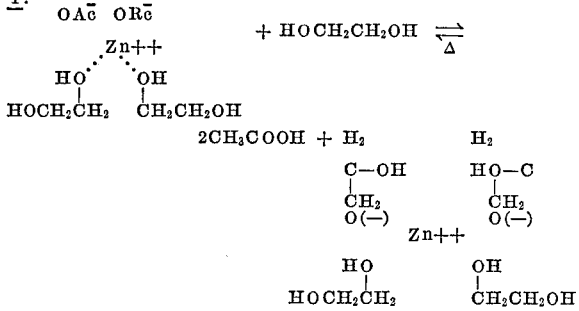

Z.

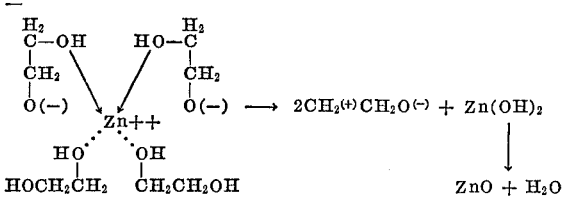

The zinc ion is known to form coordinate compounds. Thus, one would expect it to coordinate weakly with the oxygen of ethylene glycol as the water of hydration is driven off. As acetic acid is driven off at higher temperatures, the glycol becomes negatively charged at one end. This is the force needed for breaking the OC bond at the other end during the transfer of the hydroxyl to the zinc.

Acetic acid can react in either step Y, contributing to the reversibility of that step, or react with the products of step Z and convert the zinc hydroxide and/or oxide back to zinc acetate which is soluble in the ester exchange reaction medium.

A preferred embodiment of this invention is a continuous process for preparing bis(2-hydroxyethyl)terephthalate wherein liquid dialkyl terephthalate having an alkyl radical with less than 3 carbon atoms is reacted at elevated temperatures with liquid and gaseous ethylene glycol in the presence of an ester interchange catalyst zinc acetate dihydrate in a reaction zone wherein the liquid dialkyl terephthalate, ethylene glycol and liquid reaction products thereof pass downwardly into a heated collecting zone which is maintained at a temperature sufficient to vaporize ethylene glycol from said liquid reaction products and passing the ethylene glycol vapors into a lower part of the reaction zone, said liquids being in intimate contact while passing downwardly with upwardly moving ethylene glycol vapors and alkyl alcohol vapors formed in the reaction, controlling the rate at which ethylene glycol vapors rise through said reaction zone by introducing ethylene glycol vapors from a source separate from said collecting zone into the lower portion of said reaction zone, continuously removing said upwardly moving ethylene glycol and alkyl alcohol vapors from the upper portion while removing bis(2-hydroxyethyl) terephthalate continuously from said collecting zone, the improvement which comprises adding acetic acid in the amount of 0.02% to 10%, and preferably, 0.0235% to 0.188%, by weight, of liquid dialkyl terephthalate.

While the use of zinc acetate is prescribed as the catalyst for use in the preferred embodiment, the catalyst system used in this process may be any of the conventional catalyst systems so long as it is the salt of a metal and a weak acid. These include compounds containing lithium, sodium, potassium, cadmium, lanthanum, beryllium, magnesium, aluminum, molybdenum, manganese, iron, cobalt, nickel, copper, tin, lead, zinc, bismuth, antimony and other catalysts as described in U.S. Pats. 2,905,707 and 2,465,319. Also, the catalyst may be a combination of metal salts, e.g., zinc acetate and tetraisopropyl titanate, antimony trioxide and such other combinations as described in British Pat. 769,220. Generally, the exchange catalyst is present in the range of about 84 to 210 parts of elemental metal in a catalyst compound per million parts by wt. of alkyl terephthalate with the preferred rate being 80–130 parts per million. If a combination of catalysts is used more or less of each catalyst may be required depending on the combination used. The catalyst is generally added in a form of a solution in the glycol.

Once a catalyst is chosen which is the salt of a metal and a weak acid then the corresponding acid is chosen as the precipitation inhibitor. The corresponding acid is the acid having the same anion as the salt of the catalyst. For example, if manganese formate is the chosen catalyst, then formic acid is the corresponding acid which would be used as the precipitation inhibitor, or if lanthanum propionate or zinc propionate is the catalyst then propionic acid would be the acid. Suitable other salts are listed in 2,681,360.

The problem of ester exchange column plugging by the build up of catalyst precipitation in the manufacture of bis(2-hydroxyethyl) terephthalate and the solution of this problem by the addition of an acid is, for the most part, described in connection with the process and apparatus disclosed in Hurt and Pieper, U.S. Pat. 2,905,707. This disclosure is mainly a continuous process of producing bis(2-hydroxyethyl) terephthalate in which the ester interchange reaction zone is a vertical column containing multiple sieve plates. However, it is to be understood that the teachings of this invention are not limited by the type of ester exchange apparatus used. For example, this invention may be used in a bubble cap ester exchange type column such as that described in Vodonick, U.S. Pat. 2,829,153, issued Apr. 1, 1958.

This invention will now be described but is not intended to be limited by the following examples.

EXAMPLE I

The compound bis(2-hydroxyethyl) terephthalate was produced by ester exchange in a manner similar to that disclosed in Example I of Hurt and Pieper, U.S. Pat. 2,905,707. Liquid dimethyl terephthalate and ethylene glycol were introduced into the upper portion of the sieve plate column above the top plate in the weight ratio of 3.5 parts of dimethyl terephthalate per 1 part of ethylene glycol. Zinc acetate anhydride ($Zn(OAc)_2 \cdot 2H_2O$) in an ethylene glycol solution was added in an amount sufficient to provide 125 parts of metallic zinc per million parts of dimethyl terephthalate and acetic acid was added at a rate of 0.0235% of dimethyl terephthalate. Ethylene glycol was boiled up through the sieve plates. The hold time for the reactants in the column was 1½ hours.

The ester exchange column was permitted to run in this fashion for two weeks with 100% zinc through-put maintained. Zinc through-put is the amount of zinc appearing in the finished product compared to the amount of zinc added to make the product expressed in percent. The amount of zinc in the finished product may be measured by any conventional technique. If the zinc through-put is not 100% then the remaining zinc precipitates and causes column plugging.

The product formed was bis(2-hydroxyethyl) terephthalate which is then polymerized by polycondensation and formed into thin sheets. The film sheets showed excellent optical clarity, were relatively free from spots and blemishes, possessed excellent stretchability and a high uniformity of physical properties.

EXAMPLE II

In a process of producing bis(2-hydroxyethyl) terephthalate by ester interchange as disclosed in Example I, the same reaction was run except that the concentration of acetic acid was changed. The concentration of acetic acid based on the amount of dimethyl terephthalate was varied from 0.04 to 10%. Following is a table showing the concentrations used and their effect on the ester exchange column.

| Test No.: | Percent concentration of HOAc based on amount of dimethyl terephthalate in the catalyst solution | Effect on ester exchange column |
| --- | --- | --- |
| 1 | 0.042 | Inhibits zinc precipitation with 100% through-put of zinc. |
| 2 | 0.85 | |
| 3 | 1.43 | 100% through-put of zinc is maintained and concentration is great enough to dissolve any zinc precipitate on the sieve plates. |
| 4 | 2.0 | |
| 5 | 2.86 | |
| 6 | 10.00 | |

The bis(2-hydroxyethyl) terephthalate was polymerized by polycondensation and formed into thin sheets of film. The films made according to this example showed the same excellent characteristics as in Example I.

EXAMPLE III

In order to show the effect of acetic acid on the catalyst reactivity rate a mixture of 100 grams of dimethyl terephthalate, 65 grams of ethylene glycol and 0.13 gram of zinc acetate anhydride ($Zn(OAc)_2 \cdot 2H_2O$) was prepared in the following manner to determine reaction time.

A ½ liter, three necked flask was set in a heating mantel. One neck held a thermometer. The center neck held a tetrafluoroethylene stirring rod (electrically driven). A partial condenser was connected to the third neck and a total condenser connected to the partial condenser. The ingredients of dimethyl terephthalate, glycol and zinc acetate anhydride were added to the vessel and bis(2-hydroxyethyl) terephthalate prepared as disclosed in Sorensen and Cambell, Preparative Methods of Polymer Chemistry, Interscience New York (1961) p. 113. Methanol is liberated during the ester interchange reaction.

Reaction time was measured by measuring the time it took to collect 41 ml. of methanol at a given temperature. The time to collect 41 ml. of methanol was measured for the reagents where no acetic acid was used establishing a control and this was compared with other samples containing varying amounts of acetic acid.

Below is a table showing the varying amounts of acetic acid used to make bis(2-hydroxyethyl) terephthalate as described above, the temperature at the start of the reaction and the time to collect 41 ml. of methanol.

| Percent acid based on wt. of ethylene glycol in the catalyst solution | Temp. in ° C. at start of reaction | Time in min. to collect 41 ml. of methanol |
| --- | --- | --- |
| 0.0 | 145 | 59 |
| 0.0023 [1] | 145 | 60 |
| 0.5 | 145 | 60 |
| 1.0 | 147 | 61 |
| 1.5 | 148 | 60 |
| 5.0 | 150 | 70 |

[1] 1 mole $Zn(OAc)^2$ to 1 mole HOAc.

Low concentrations of acetic acid have little effect on zinc catalyst reactivity.

EXAMPLE IV

A sample of polyester film as prepared in Example I was coated, before stretching, with a sublayer of vinylidene chloride, methyl acrylate, itaconic acid and ethyl acrylate as in Example I of Rawlins, U.S. Ser. No. 494,257, filed Oct. 8, 1965 U.S. Pat. 3,443,950, May 13, 1969. A conventional photosensitive, X-ray emulsion containing silver bromide grains consisting of 1.2% AgI and 98.8% AgBr, and 105 grams of gelatin per 1.5 moles of silver halide was then coated over the resin subbed base. The sample was then imagewise exposed and developed in a conventional X-ray developer, fixed and washed. The dried film showed excellent photographic qualities.

The photosensitive emulsion may be a silver halide emulsion of the silver bromide, silver bromoiodide, silver bromochloride, or pure silver chloride types containing conventional emulsion additives such as hardeners, surfactants, chemical sensitizers, optical sensitizers, antifoggants, etc. The emulsion may also be protected by anti-abrasion coatings, e.g., of gelatin to which matting agents such as starch, $SiO_2$ particles, polymeric latices, etc. may be added.

The emulsion binder may be gelatin or other natural or synthetic organic colloid binding agents. Suitable binders include water permeable or water-soluble polyvinyl alcohol and its derivatives, e.g., partially hydrolyzed polyvinyl acetates, polyvinyl ethers, etc. Other suitable colloids are disclosed in U.S. 2,276,322; 2,276,323; 2,347,811; 2,495,918; 2,833,050.

An advantage of this invention is that, in a continuous process of making polyethylene terephthalate from bis(2-hydroxyethyl) terephthalate and ethylene glycol, the addition of acetic acid acts as a precipitation inhibitor in the ester exchange step where bis(2-hydroxyethyl) terephthalate is formed and prevents the formation of precipitates. If a vertical column with multiple sieve plates is used for the ester interchange the process of this invention will keep the sieve plates from plugging. If the plates have already been plugged, an increased amount of acetic acid may be added to complete the precipitate already formed and clean the sieve holes to keep the process running continuously and smoothly. The process is useable in other type apparatus used to accomplish an ester interchange such as a bubble-cap column.

Another advantage of this invention is that it produces a polyester film product useable in the art of photography, textile fibers and film.

The embodiments of the invention in which an exclusive property or privilege is claimed are defined as follows:

1. In a process of reacting a glycol of the formula $HO(CH_2)_nOH$, where $n$ is 2 to 10, inclusive, with a dialkyl ester of terephthalic acid having 1 to 4, inclusive, carbon atoms in the alkyl radicals to form a bis(hydroxyalkyl) terephthalate by ester interchange in the presence of an ester interchange catalyst which is the salt of a metal selected from the group consisting of lithium, sodium, potassium, cadmium, lanthanum, berylium, magnesium, aluminum, molybdenum, manganese, iron, cobalt, nickel, copper, tin, lead, zinc, bismuth, and antimony, and a fatty acid of 1–18 carbon atoms, the improvement which comprises carrying out the ester interchange in the presence of an acid having the same anion as said salt in an amount of 0.02% to 10% by weight of liquid dialkyl terephthalate.

2. A process according to claim 1, wherein said dialkyl ester is dimethyl terephthalate, said glycol is ethylene glycol, said metal salt is zinc acetate, and said acid is acetic acid.

3. A process according to claim 2, wherein said acetic acid is present in an amount of 0.0235% to 0.188% of the dimethyl terephthalate.

4. A process according to claim 2, wherein said reaction is carried out in a bubble column and the ethylene glycol and methyl alcohol pass upwardly while the dialkyl terephthalate, metal salt, acid and bis-(2-hydroxyethyl) terephthalate flow downwardly, and the latter is removed continuously from the column.

References Cited

UNITED STATES PATENTS 3,391,122   7/1968   Bice et al. _____ 260—475

FOREIGN PATENTS 740,381   11/1955   Great Britain _____ 260—75

LEWIS GOTTS, Primary Examiner

E. J. SKELLY, Assistant Examiner